United States Patent [19]

Pensa

[11] 4,180,981
[45] Jan. 1, 1980

[54] HYDROSTATIC TRANSMISSIONS

[75] Inventor: Carlo Pensa, Esino Lario, Italy

[73] Assignee: Massey-Ferguson Services N.V., Curacao, Netherlands Antilles

[21] Appl. No.: 900,905

[22] Filed: Apr. 28, 1978

[30] Foreign Application Priority Data

Apr. 29, 1977 [GB] United Kingdom ............... 17943/77

[51] Int. Cl.$^2$ ............................................. F16H 39/46
[52] U.S. Cl. ........................................ 60/435; 60/445; 74/11; 180/53 D
[58] Field of Search ................. 60/423, 431, 435, 445, 60/698, 706; 74/11; 180/53 B, 53 D; 417/1

[56] References Cited

U.S. PATENT DOCUMENTS 2,774,436  12/1956  Ferris ................................. 60/423 X
3,371,479  3/1968  Yapp et al. ............................ 60/431

Primary Examiner—Edgar W. Geoghegan
Attorney, Agent, or Firm—William R. Nolte

[57] ABSTRACT

A vehicle having a prime mover, a hydrostatic transmission transmitting power from the prime mover to ground engaging members on said vehicle, a power take-off arranged to be driven by said prime mover and clutch means for selectively engaging the power take-off with the prime mover. The vehicle also includes regulator means operable upon the transmission to maintain the power consumption of the transmission below a predetermined level, and compensating means operable upon the regulator means upon engagement of the clutch means to reduce the predetermined level of power consumption of the transmission.

5 Claims, 3 Drawing Figures

HYDROSTATIC TRANSMISSIONS

BACKGROUND OF THE INVENTION

This invention relates to hydrostatic transmissions and more particularly to regulators and controls for use with such transmissions.

A hydrostatic transmission usually comprises a variable capacity pump and a fixed or variable capacity motor interconnected by fluid conduits. The pump is rotated by a prime mover and transmits energy through fluid conveyed by the conduits to the motor. The power absorbed by the transmission is the product of the rate of flow of the fluid from the pump and the pressure of the fluid delivered by the pump.

The flow rate is determined principally by the capacity of pump, i.e., the volume of fluid displaced per revolution of the pump, and the pressure is determined principally by the load imposed on the motor.

It is possible that a condition of the transmission may be chosen which results in a dangerous overload of the transmission or prime mover. It is therefore desirable that a regulating device be provided which controls the transmission in accordance with a predetermined parameter for example the power consumption or the torque imposed on the motor.

A complication found in vehicles using hydrostatic transmissions is the provision of a power take-off. This is usually driven directly from the engine with a hydraulic clutch to permit selective engagement of the power take-off. Since drive is directly from the engine the power consumption of the power take-off is not detected by the transmission control with the result that overloading of the prime mover may result.

It is an object of the present invention to provide a vehicle having a hydrostatic transmission in which the above disadvantages are obviated or mitigated.

SUMMARY OF THE INVENTION

According to the present invention there is provided a vehicle having a prime mover, a hydrostatic transmission transmitting power from the prime mover to ground engaging members on said vehicle, a power take-off arranged to be driven by said prime mover and having clutch means for selectively engaging the power take-off with the prime mover, regulator means operable upon the transmission to maintain the power consumption thereof below a predetermined level, and compensating means operable upon the regulator means upon engagement of the clutch means to reduce said predetermined level of power consumption of the transmission.

Preferably the hydrostatic transmission includes a pump having a variable delivery flow rate and the regulator means includes a valve having a spool movable within a housing in response to changes in the power consumption of the transmission to vary the delivery flow rate of the pump.

Preferably also the compensating means is arranged to move the valve spool to reduce the delivery capacity of the pump on engagement of the clutch means thus reducing said predetermined level of power consumption.

Conveniently, the clutch means may be provided with an operating means which is connected with a cam, the operating means being arranged to move the cam on engagement of the clutch means to apply force to the valve spool to produce said reduction in delivery capacity of the pump.

BRIEF DESCRIPTION OF THE DRAWINGS

An embodiment of the invention will now be described by way of example only with reference to the accompanying drawings in which.

DESCRIPTION OF THE PREFERRED EMBODIMENT

Figure 1:
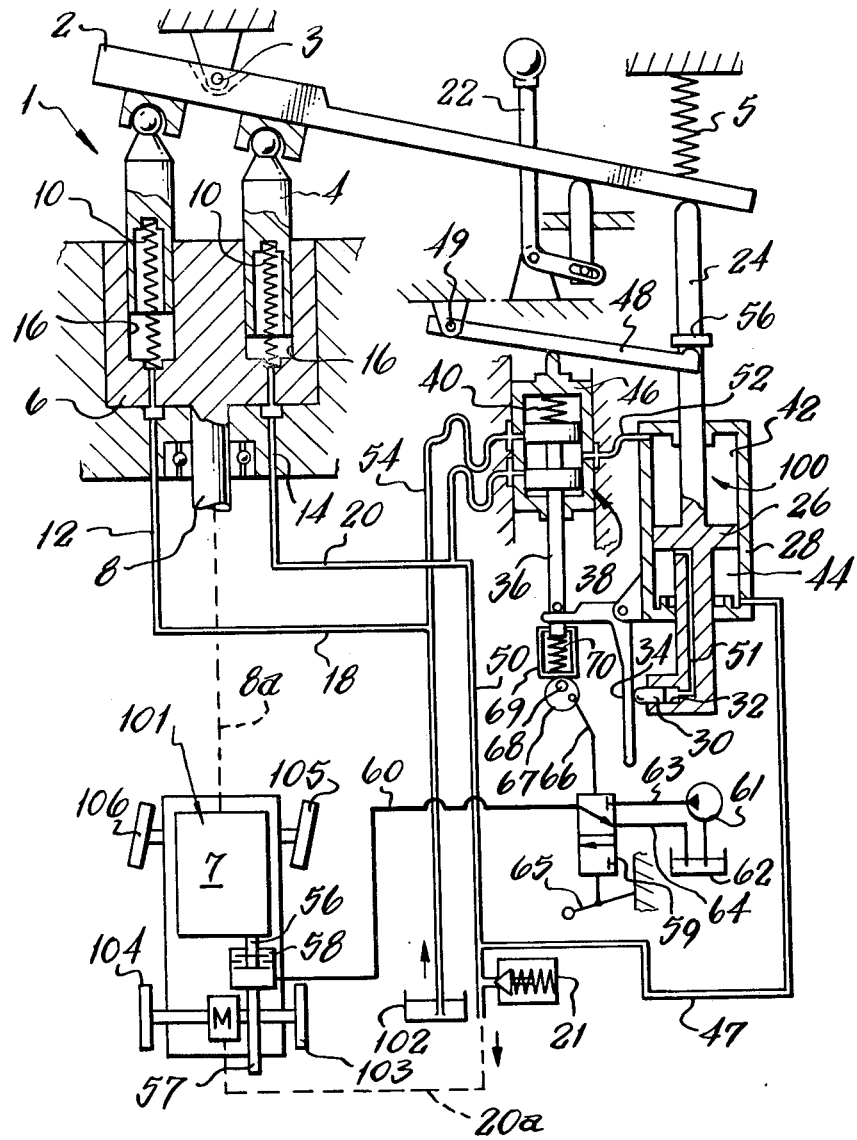
FIG. 1 is a diagrammatic representation of a vehicle having a variable capacity pump and a regulator arrangement embodying the invention.

Referring now to FIG. 1, a vehicle 101 having a prime mover 7 is provided with steerable front wheels 105 and 106 and non-steerable rear wheels 103 and 104. The rear wheels are powered by a hydrostatic motor M via suitable gearing (not shown), the motor receiving its power from a variable capacity pump 1 which is driven from the prime mover by a shaft 8 as shown diagrammatically at 8a in FIG. 1.

The variable capacity pump 1 has a swashplate 2 for varying the stroke of plungers 4. The swashplate is fulcrumed as at 3 and biased toward the maximum stroke position by a spring 5. The barrell 6 of the pump 1 and the plungers 4 are rotated by the shaft 8 thus causing the plungers 4 to reciprocate in the barrel 6. Springs 10 ensure that the plungers 4 follow the swashplate 2.

An inlet port 12 and outlet port 14 permit flow to and from bores 16 in which the plungers 4 slide. The inlet port 12 allows fluid to flow into the bores 16 from a suction conduit 18 from a sump 102 as the plunger 4 is moving along the bore 16 under the action of the spring 10.

As the direction of the plunger 4 is reversed, by virtue of the rotation of the barrel 6, the bore 16 is connected to the outlet port 14 and fluid is expelled into a pressure conduit 20, which is connected as indicated diagrammatically at 20a, with the hydrostatic motor M which powers the rear wheels 103 and 104.

The maximum pressure in line 20 is governed by a relief valve 21. The inclination of the swashplate 2 may be adjusted by a manual control, shown diagrammatically at 22 to give increased piston stroke and consequently increased fluid displacement.

The swashplate 2 ia also acted on by a regulator means in the form of a servo motor 100 and valve 38. A piston rod 24 of the servo motor 100 engages the swashplate 2 and is connected to a piston 26 which slides within a fixed cylinder 28. The piston rod 24 extends through both end walls of the cylinder 28 and carries at its lower end a piston 30 mounted within a cavity 32. The piston 30 bears against one arm of a bellcrank 34 which is fulcrumed to the cylinder 28. The other arm of the bellcrank 34 operates a spool 36 slidably mounted within the body 46 of the valve 38 which controls flow to or from the cylinder 28. Movement of the bellcrank 34 by the piston 30 is opposed by a spring 40 which is mounted between the body 46 and the spool 36. The body 46 is slidably mounted and bears against a lever 48 which is pivotable about a pin 49 and co-operates with a shoulder 56 formed on the piston rod 24.

The piston 26 divides the cylinder into two chambers 42, 44. The chamber 44 is supplied with fluid by way of conduit 47 which is connected to the pressure conduit 20. A duct 51 formed in the piston rod 24 conveys fluid from the chamber 44 to the cavity 32. Thus the piston 30 is subjected to the same fluid pressure as exists in the pressure conduit 20.

Pressure fluid is supplied by way of conduit 50 to the control valve 38 which controls flow to or from the chamber 42 through conduit 52, and exhausted fluid is taken from the valve 38 to the suction conduit 18 by a conduit 54.

For convenience in the system shown in FIG. 1 the pressure conduit 20 of the pump 1 is used as the source of pressurized fluid for the control valve 38. Alternatively, for example, a completely separate constant displacement pump could be used to supply the control valve 38.

A shaft 56 is driven by the prime mover 7 and is connected to a power take-off shaft 57 by a hydraulically operated clutch 58. The clutch 58 is controlled by a two position valve 59 hydraulically connected to the clutch 58 by a conduit 60. A pump 61 supplies fluid from a sump 62 to the valve 59 through a conduit 63 and a return conduit 64 is connected between the valve 59 and the sump 62.

The valve 59 is movable from the position shown, in which the conduits 60 and 64 are connected, to a second position, in which the conduits 60 and 63 are connected, by a manual control lever 65.

The lever 65 is connected through the valve 59 to a link 66 which is in turn connected to a cam 67. The cam 67 is pivotally mounted on an axis 68 and bears against one end of a capsule 69. A spring 70 is mounted within the capsule 69 and bears against the lower end of the spool 36.

Figure 2:
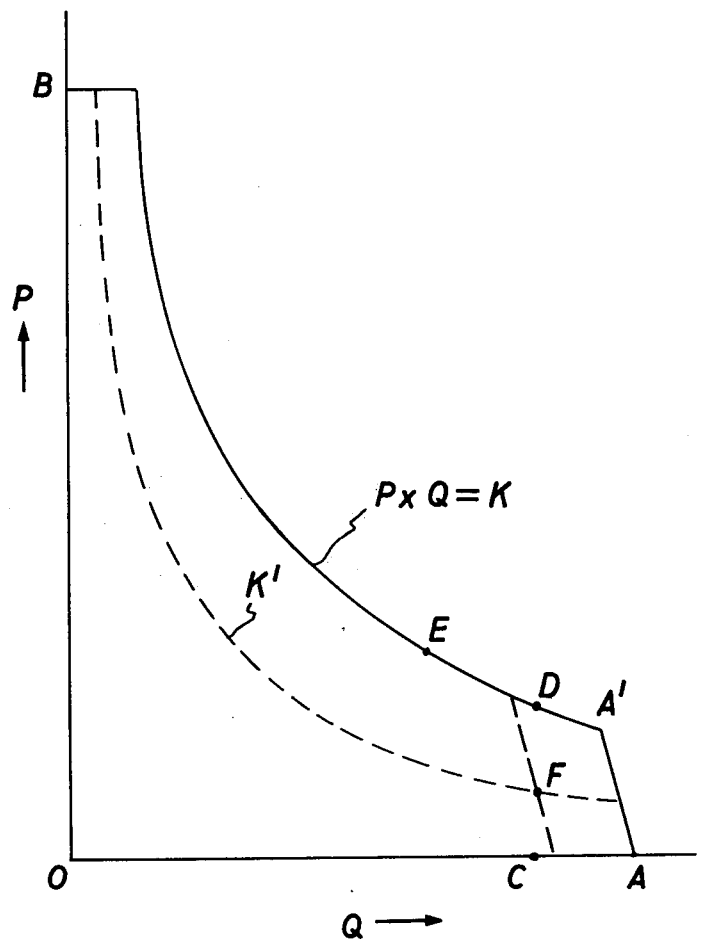
FIG. 2 is a graph of pressure versus flow for the arrangement of FIG. 1 showing a constant horsepower curve and FIG. 3 is a diagrammatic representation of the signal path of the pump and regulator shown in FIG. 1.

The graph of FIG. 2 is a plot of pressure (P) versus flow rate (Q) for a maximum constant power rating (K). The abscissa of point A′ represents the maximum flow rate available from the pump 1 when operating under full load. The line A′ A represents, at the maximum setting of the pump, the extra volume that the pump is able to displace due to the increase in speed which occurs with a governed prime mover in the form of, for example, a diesel engine when it moves from a full load condition (at A′) to a no load condition (at A). A similar sloping line exists for every volume setting of the pump. The ordinate B represents the maximum system pressure as set by the relief valve 21. The abscissa of point D, which is point C, represents a chosen flow rate of the pump (lower than the maximum) as set by the manual control 22.

In the position shown in FIGS. 1 and 2 the power absorbed by the pump matches the power delivered by the prime mover and is denoted by the point D on the graph. The pressure delivered by the pump to the conduit 20 is transmitted to the cavity 32 and urges the piston 30 against the spring 40. The position of the piston 30 along the bellcrank 34 is proportional to the flow rate of the pump 1, as determined by the swashplate position, and so the moment acting on the bellcrank is proportional to the product of the pressure and the flow rate i.e. the power through put of the pump. The spring 40 exerts a force sufficient to balance the moment exerted by the piston 30 at the maximum power rating. Thus the valve 38 remains in a neutral condition and fluid is locked in the chamber 42 so preventing movement of the piston 26 under the influence of pressure in the chamber 44.

If the pressure in the conduit 20 now increases, the force exerted by the piston 30 overcomes the spring 40 and causes the bellcrank 34 to rotate clockwise about its pivot, moving the spool 36 upwards. The conduit 52 is thus connected to the conduit 54 and fluid flows from the chamber 42 allowing the piston 26 to move upwards and decrease the flow of the pump.

Since the piston 30 moves with the piston rod 24, the lever 48 pivots about the pin 49 and allows the body 46 to move upwardly under the force exerted by the spring 40 so returning the valve 38 to a neutral condition and preventing further flow from the chamber 42.

The moment arm of the piston 30 is decreased and the spring 40 balances the spool 36 in a neutral position against the force of the piston 30. This condition is represented, for example, by the point E on the curve.

If the pressure in the pressure conduit 20 now drops, the spring 40 forces the piston 30 into the cavity 32 and moves the spool 36 downwards, thus connecting the conduit 50 with the conduit 52. Fluid flows into the chamber 42 at equal pressure to that in chamber 44. The side of the piston 26 facing the chamber 42 has a greater surface area than that facing the chamber 44 by virtue of the differing diameter of the piston rod 24 on each side of the piston 26. The net force acting on the piston 26 causes it to move downwards expelling fluid from the chamber 44 and increasing the flow rate of the pump 1. The lever 48 is moved with the piston rod 24 and moves the body 46 downwardly to cut-off flow through the line 52. The moment arm of the piston 30 increases and balances the bellcrank 34 against the spring 40 to hold the spool 36 in neutral.

Thus when the power take-off shaft is not in use the regulator means adjusts the delivery capacity of the pump 1 to maintain the power rating as close as possible to the constant maximum power rating hyperbola K.

It will be understood from the above that a certain force applied to the spool 36 of the valve 38 represents a specific amount of power taken from the engine.

Figure 3:
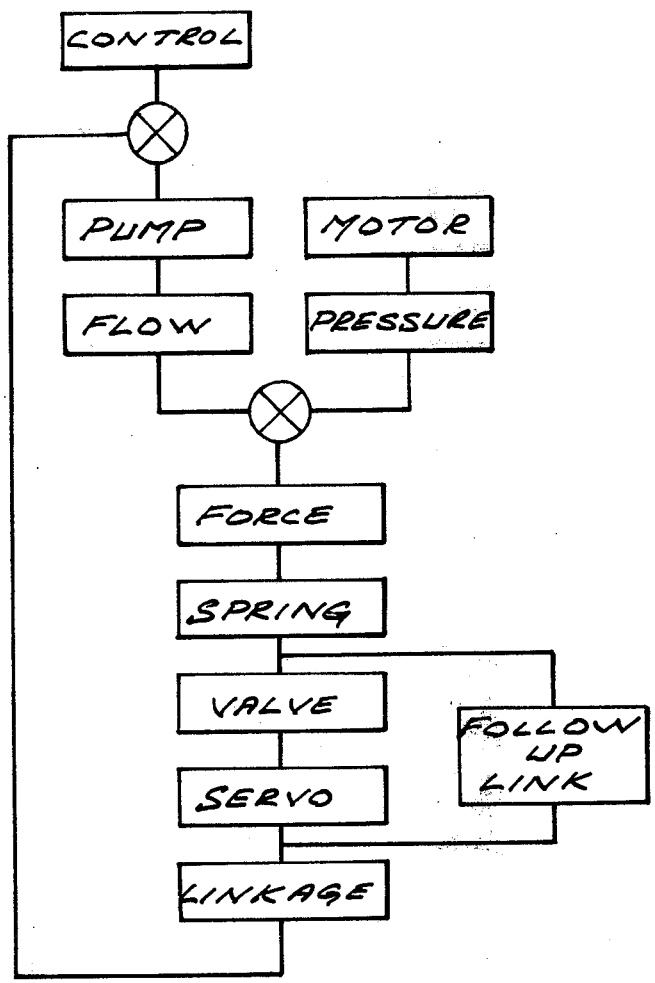

As can be seen in FIGS. 1 and 3 the length of the signal path between the servo motor 100 and valve 38 is shortened by virtue of the presence of the lever 48 which acts as a follow-up link so that hunting of the transmission is eliminated.

This point can be appreciated from the fact that without the lever 48 the signal path from the servo motor 100 to the valve 38 would be via a linkage provided by the swashplate 2, the generated pump pressure, the sensing piston 30, and the bellcrank 34. The use of the lever 48 provides a direct connection between the servo motor 100 and the valve 38 thus reducing the response time of the transmission. The shortened signal path provided by the lever 48 is readily apparent from FIG. 3 in which the lever 48 is referred to as a "follow-up link" and the longer signal path between the servo and the valve is represented by the left hand loop designated servo, linkage, pump, flow, force, spring, valve.

When the power take-off shaft 57 is energised the lever 65 is moved from the position shown to connect the clutch 58 to the pump 61 and so connect the shaft 56 to the power take-off shaft 57. The movement of the lever 65 also causes rotation of the cam 67 about the axis 68 so that the spool 36 is loaded by the spring 70. This has the effect of applying an additional force to the spool 36. By arranging this force to be proportional to the maximum power that can be transmitted through the power take-off shaft (this being proportional to the line F D in FIG. 2) the regulator means is arranged to reduce the delivery capacity of the pump 1 so that the maximum power now available to drive the motor M is represented by the dotted hyperbola K' passing through the point F.

Thus to summarise the operation of the transmission, when the lever 65 is moved to energise the power take-off shaft the power made available to the traction pump from the prime mover is reduced by an amount equal to the maximum power which the power take-off shaft can deliver. This removes the possibility of overloading the prime mover as a result of using the power take-off shaft.

It will be appreciated that, although the invention has been described above in relation to a vehicle using a hydrostatic transmission with a single pump and motor, it is also applicable to hydrostatic transmissions with two or more pumps and motors.

For example, the invention is suitable for use in a crawler vehicle provided with two tracks and a separate pump and motor system to power each track. In such a vehicle each pump would be connected with a servo motor similar to the servo motor 100 described above and both servo motors would be connected as at 48 and 52 with a common valve 38. Both servo motors would also be arranged to act on the swashplate 2 of their respective pump and to communicate the position of their respective swashplates to the valve 38 via separate bellcrank arrangements similar to that shown at 34 in FIG. 1.

In this manner the valve 3 would be acted upon by signals from both swashplates and would thus receive signals proportional to the total power delivered to the two pumps.

I claim:

1. A vehicle having a prime mover, a hydrostatic transmission transmitting power from the prime mover to ground engaging members on said vehicle, a power take-off arranged to be driven by said prime mover and having clutch means for selectively engaging the power-take off with the prime mover, regulator means operable upon the transmission to maintain the power consumption thereof below a predetermined level, and compensating means operable upon the regulator means upon engagement of the clutch means to reduce said predetermined level of power consumption of the transmission.

2. A vehicle according to claim 1 wherein the hydrostatic transmission includes a pump having a variable delivery flow rate and the regulator means includes a valve having a spool movable within a housing in response to changes in the power consumption of the transmission to vary the delivery flow rate of the pump.

3. A vehicle according to claim 2 wherein the compensating means is arranged to move the valve spool to reduce the delivery capacity of the pump on engagement of the clutch means thus reducing said predetermined level of power consumption.

4. A vehicle according to claim 3 wherein the clutch means is provided with an operating means which is connected with a cam, the operating means being arranged to move the cam on engagement of the clutch means to apply force to the valve spool to produce said reduction in delivery capacity of the pump.

5. A vehicle according to claim 4 wherein spring means are arranged to act between the cam and the valve spool.

* * * * *